(12) United States Patent
McWilliam

(10) Patent No.: US 9,562,520 B2
(45) Date of Patent: Feb. 7, 2017

(54) APPARATUS AND METHOD FOR PRODUCING ELECTRICITY AND TREATED WATER

(71) Applicant: Noel McWilliam, Benfleet (GB)

(72) Inventor: Noel McWilliam, Benfleet (GB)

( * ) Notice: Subject to any disclaimer, the term of this patent is extended or adjusted under 35 U.S.C. 154(b) by 139 days.

(21) Appl. No.: 14/353,752

(22) PCT Filed: Oct. 23, 2012

(86) PCT No.: PCT/GB2012/052625
§ 371 (c)(1),
(2) Date: Apr. 23, 2014

(87) PCT Pub. No.: WO2013/061045
PCT Pub. Date: May 2, 2013

(65) Prior Publication Data
US 2014/0283516 A1    Sep. 25, 2014

(30) Foreign Application Priority Data

Oct. 23, 2011  (GB) .................................. 1118249.0

(51) Int. Cl.
| | |
|---|---|
| F03G 6/06 | (2006.01) |
| C02F 1/16 | (2006.01) |
| C02F 1/06 | (2006.01) |
| C01B 5/00 | (2006.01) |
| C02F 1/44 | (2006.01) |
| C02F 3/34 | (2006.01) |
| C02F 1/14 | (2006.01) |
| C02F 103/08 | (2006.01) |

(52) U.S. Cl.
CPC . *F03G 6/06* (2013.01); *C01B 5/00* (2013.01); *C02F 1/06* (2013.01); *C02F 1/16* (2013.01); *C02F 1/441* (2013.01); *C02F 3/34* (2013.01); *C02F 1/14* (2013.01); *C02F 2103/08* (2013.01); *Y02E 10/46* (2013.01); *Y02W 10/37* (2015.05)

(58) Field of Classification Search
CPC .............. F03G 6/06; C01B 5/00; C02F 1/441; C02F 1/16; C02F 3/34; C02F 1/06; C02F 2103/08; C02F 1/14; Y02W 10/37; Y02E 10/46
USPC ........................... 60/641.8–641.15, 676, 685
See application file for complete search history.

(56) References Cited

U.S. PATENT DOCUMENTS

| | | | |
|---|---|---|---|
| 8,742,623 B1 * | 6/2014 | Biederman | G02B 27/017 307/80 |
| 2005/0279095 A1* | 12/2005 | Goldman | F01K 13/00 60/641.8 |
| 2008/0078436 A1* | 4/2008 | Nachamkin | H02J 3/382 136/244 |

(Continued)

*Primary Examiner* — Hoang Nguyen
(74) *Attorney, Agent, or Firm* — Donn K. Harms

(57) ABSTRACT

The present invention provides an integrated system for the combined purpose of electricity generation and water treatment and biofuel production. The configuration combines complementary sub-systems whereby outputs from one system are used as inputs to another creating a positive feedback mechanism that significantly increases system efficiency and output. Compensatory mechanisms between system components create a natural hedge in energy and water production against temporal variation in solar insolence levels. Secondary benefits of the invention may include carbon abatement, ground water improvements, and land regeneration.

21 Claims, 6 Drawing Sheets

(56) References Cited

U.S. PATENT DOCUMENTS

2011/0081586 A1\* 4/2011 McAlister ............... C25B 11/03
                                                                                            429/422
2011/0265474 A1\* 11/2011 Schubert ................. C02F 1/048
                                                                                           60/641.9

\* cited by examiner

APPARATUS AND METHOD FOR PRODUCING ELECTRICITY AND TREATED WATER

This application is a national phase application based on PCT/GB2012/052625 filed on Oct. 23, 2012 which is an international application of British application number 1118249.0 filed on Oct. 23, 2011.

The present invention relates to a system for producing electricity and treated water.

The nature of energy generation from renewable sources is problematic in that transient supply is most often asynchronous to demand. This is particularly acute in power production since it is not generally feasible to store electrical power, and so highly variable demand must be met with near instantaneous changes in generation. Unlike fossil-fuel (typically gas) technologies that can be brought on-line rapidly, nuclear and renewable production is relatively steady and cannot therefore complete the market in peak times unless capacity oversupplies at other times. For this reason co-generation of fresh water from seawater desalination is widely employed in the nuclear industry to ensure base load production is utilised. Back-up energy sources are usually installed in solar systems and are often fossil-powered or make use of costly molten nitrate salt technologies to store energy for overnight/peak load use.

Geographic variation of natural resources also limits the potential of renewables to compete with fossils: solar energy on its own is a vast resource with ground-level global irradiance levels totalling about 89 peta ($10^{15}$) watts which is enough to meet the world's electricity needs 20,000 times over[i]. Equatorial regions with dry climates provide the best locations for solar having minimum attenuation and little or no scattering of light from atmospheric moisture.

Unfortunately these areas also tend to be desert, arid or semi-arid with low population densities and low demand. Hence supply is high where demand is low.

The absence of capital-intensive extensive transmission infrastructures linking inhospitable regions to areas of high demand is a significant barrier to realising the potential of solar. Although there is some discussion for large-scale systems in the Sahara and Thar deserts, it is likely that such costs will otherwise exclude smaller scale installations in the best locations.

Further, in many arid and semi-arid regions of the world precipitation levels are insufficient to meet the needs of agricultural production. In such regions farmers must rely on secondary sources of fresh water. The wide-spread and intensive use of ground-water for human consumption and agriculture in many states in India has led to a rapid reduction in water-table levels. In northern states such as Gujarat water levels are believed have reduced by 26% within the last 15 years, and in some areas, such as Mehsana are declining at rates ranging from 0.91 m to 6.02 m per year.

As water levels recede the quality also deteriorates, with an estimated 27% of villages in Gujarat having problems associated with excess fluoride and nitrate levels in ground water—which is the main source of the region's drinking water. Aside from the consequences to human health, high levels of salinity in irrigation water stresses plant systems impacting crop yields and soil permeability.

Seawater desalination is increasingly seen as a feasible solution to global water resource issues and world-wide capacity has more than doubled from 12.3 to 35.6 million cubic meters per day between 1994 and 2004 to meet this demand. These plants are often powered by fossil fuels and unless alternatives are found will have an increasing impact on greenhouse gas emissions. Reverse Osmosis (RO) is seen as a competitive technology due to high rates of production but requires relatively large amounts of electricity to pump contaminated water through a semi-permeable membrane. In contrast Multi-Stage Flash (MSF) and Multi-effect desalination (MED) may be configured in co-generation plants to make use of waste heat from power systems—it seems likely therefore that the carbon footprint of RO will not compare favourably.

Additionally seawater RO may have limited use in agriculture since the product contains relatively high levels of Boron. Trials using irrigation water from the world's largest RO plant in Ashkelon, Israel have indicated that levels of 2 mg/liter typical of RO units is toxic to all but the most tolerant crops. Boron removal technology may be employed but may add substantially to the cost of production.

The present invention seeks to address these issues.

According to a first aspect of the present invention there is provided an apparatus for producing electricity and treated water comprising:

i) means for solar generation of electricity;
ii) means for generation of electricity from biofuel;
iii) means for treating water;
wherein at least one output from the means for generation of electricity may be used to power the means for treating water.

Preferably one output from the means for generation of electricity used to power the means for treating water is a source of thermal energy.

In one embodiment the source of thermal energy is steam.

In one embodiment one output from the means for generation of electricity used to power the means for treating water is electricity.

Preferably the apparatus further comprises means for irrigating and growing crops.

Preferably the means for irrigating and growing crops uses water produced by the means for treating water.

Preferably the apparatus further comprises means for generating biofuel.

Preferably the means for generating biofuel uses at least some of the crops produced by the means for irrigating and growing crops and/or their residues.

In one embodiment the means for generation of electricity from biofuel comprises a fired boiler and a turbine.

Preferably biofuel generated from the means for generating biofuel is used as a source of fuel in the means for generating electricity.

In one embodiment the means for generating electricity incorporates a fuel-cell.

In one embodiment the means for treating water comprises a multi-stage flash desalination plant.

In another embodiment the means for treating water comprises a thermophillic sewage treatment system.

In one embodiment the means for treating water comprises a unit powered at least in part from electrical energy.

In one embodiment the means for treating water includes a reverse osmosis plant powered at least in part from electricity output by the means for generating electricity.

In one embodiment the means for treating water comprises a heat exchanger serving as conduit of energy from the means for generating electricity to the means for treating water.

In one embodiment the heat exchanger serves as a condensing unit for the output of a turbine.

In one embodiment the means for generation of solar electricity comprises a solar thermal collection system and an unfired boiler.

In one embodiment the solar thermal collection system comprises a heliostat array and a solar tower system.

In one embodiment the output flow from the condensing unit may be selectively fed to either or both the unfired and the fired boiler.

In another embodiment the means for generation of solar electricity comprises a photo-voltaic system.

Preferably the apparatus further comprises means for the storage of biofuel.

In one embodiment the apparatus is an industrial plant.

According to a second aspect of the present invention there is provided a method for producing electricity and treated water comprising providing:
i) means for solar generation of electricity;
ii) means for generation of electricity from biofuel;
iii) means for treating water;
wherein at least one output from the means for generation of electricity may be used to power the means for treating water.

Preferably one output from the means for generation of electricity used to power the means for treating water is a source of thermal energy.

In one embodiment the source of thermal energy is steam.

In one embodiment one output from the means for generation of electricity used to power the means for treating water is electricity.

Preferably the method further comprises providing means for irrigating and growing crops.

Preferably the means for irrigating and growing crops uses water produced by the means for treating water.

Preferably the method further comprises providing means for generating biofuel.

Preferably the means for generating biofuel uses at least some of the crops produced by the means for irrigating and growing crops and/or their residues.

In one embodiment the means for generation of electricity from biofuel comprises a fired boiler and a turbine.

Preferably biofuel generated from the means for generating biofuel is used as a source of fuel in the means for generating electricity.

In one embodiment the means for generating electricity incorporates a fuel-cell.

In one embodiment the means for treating water comprises a multi-stage flash desalination plant.

In another embodiment the means for treating water comprises a thermophillic sewage treatment system.

In one embodiment the means for treating water comprises a unit powered at least in part from electrical energy.

In one embodiment the means for treating water includes a reverse osmosis plant powered at least in part from electricity output by the means for generating electricity.

In one embodiment the means for treating water comprises a heat exchanger serving as conduit of energy from the means for generating electricity to the means for treating water.

In one embodiment the heat exchanger serves as a condensing unit for the output of a turbine.

In one embodiment the means for generation of solar electricity comprises a solar thermal collection system and an unfired boiler.

In one embodiment the solar thermal collection system comprises a heliostat array and a solar tower system.

In one embodiment the output flow from the condensing unit may be selectively fed to either or both the unfired and the fired boiler.

In another embodiment the means for generation of solar electricity comprises a photo-voltaic system.

Preferably the method further comprises providing means for the storage of biofuel.

A specific embodiment will now be described with reference to the accompanying drawings, which exemplify the present invention and, together with the description, serve to explain and illustrate principles of the invention. The examples given are intended to be illustrative and are not inherently restricted to particular apparatus. The drawings are not intended to depict every aspect of actual embodiments nor relative dimensions of the depicted elements and are not drawn to scale:

Figure 1:
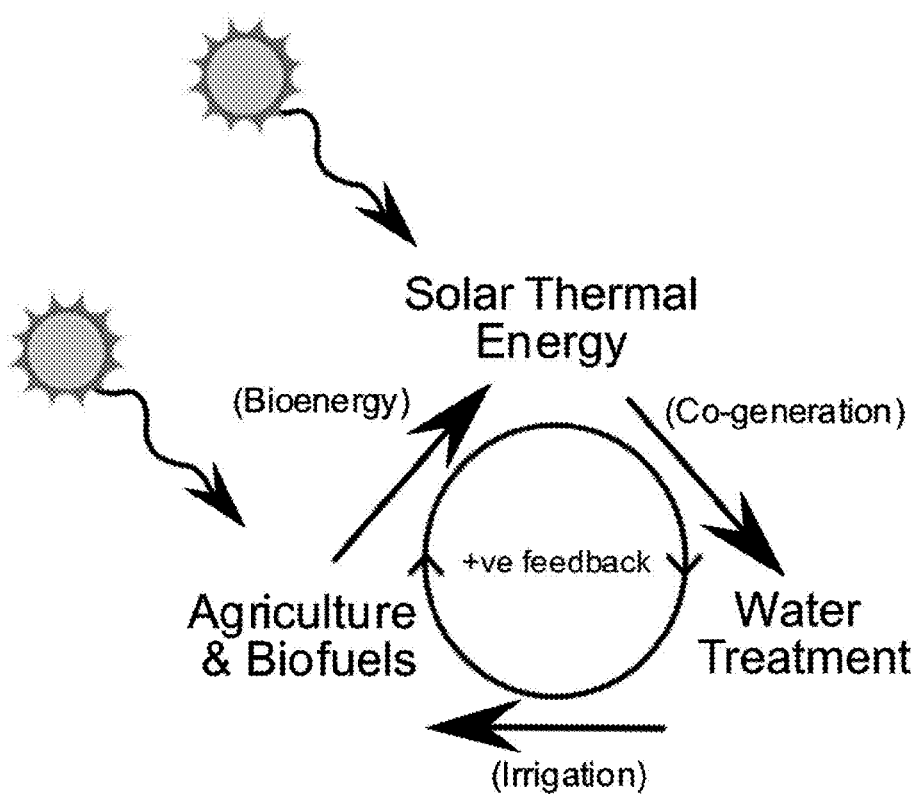
FIG. 1 is a simplified system diagram illustrating the essential energy circuit of the present invention.
Figure 2:
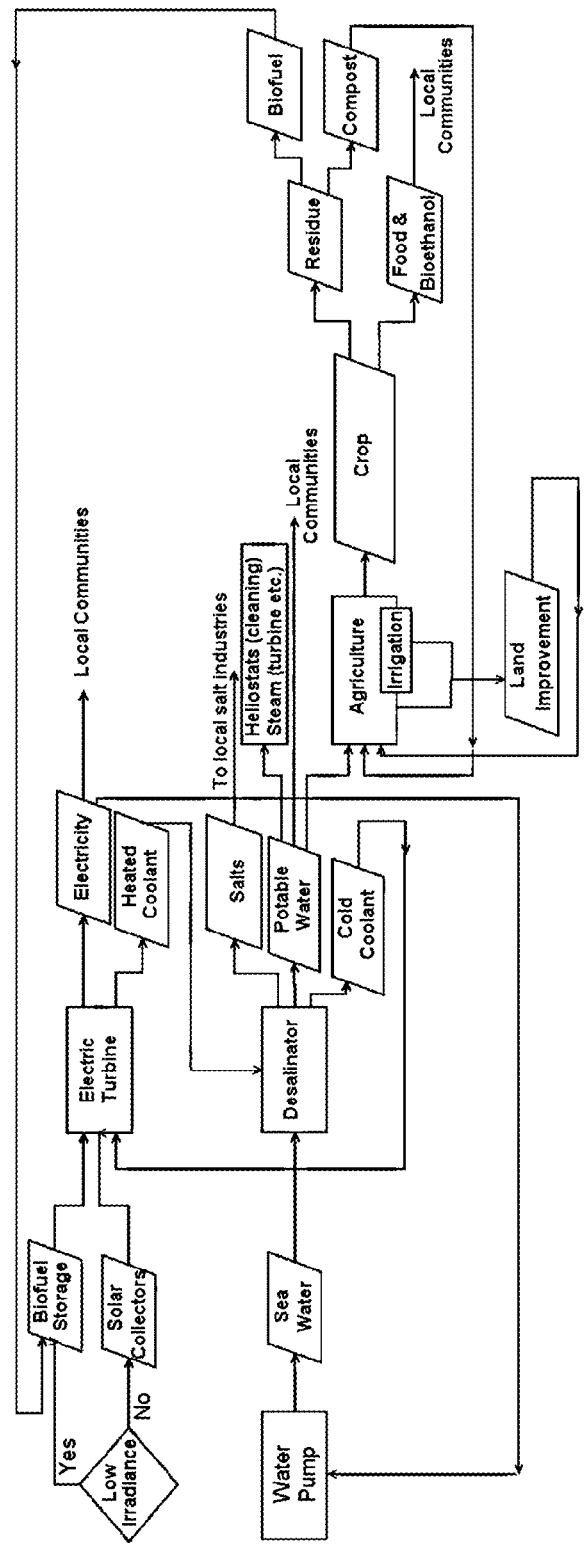
FIG. 2 shows a system diagram illustrating the energy circuit that may be derived by use of the present invention.

Referring to FIGS. 1 and 2, it can be seen that irrigation water and the biofuel supported by it act as energy storage wherein solar irradiance is translated into treated water, to biofuel and back to heat energy when required. The present invention does not use costly energy storage mechanisms often employed in the overnight running of a plant, nor is there a reliance on fossil-fuel back-up systems or the infrastructure required to supply it.

Electricity produced either by solar power or biofuel and preferably by both is used to power a desalination system. In the present embodiment the electricity derived from solar power and biofuel drives a pump to power sea water into the desalination unit. Excess electricity may be distributed to local communities.

A turbine is powered by steam produced in the fired and unfired boilers from thermal energy sourced from biofuel and solar power respectively. The output steam from the turbine is used to effect desalination of the saline water pumped into the desalination unit.

In the process of desalination the steam output from the turbine is condensed in a condenser with a possible additional cooling effect. This condensed output from the condenser in the desalination unit is then returned to be heated in the fired and/or unfired boilers.

Water produced by the desalination may be used to irrigate crops and as drinking water.

Waste residues from crops grown using the desalinated water may then be used to produce biofuel for use in the fired boiler.

By using outputs of the system as system inputs the present invention creates a closed-loop energy circuit, setting-up a positive feedback mechanism in which plant outputs are increased year-on-year. This is possible since each unit output water used for irrigation increases the biofuel support the plant receives, which in turn increases the amount of water available for irrigation.

It might be speculated that inefficiencies in conversion and storage may result in rapidly diminishing returns at each iteration of this feedback process. While this is ultimately true, the use of water in crop production increases yield (by reducing water-stress and improving plant photosynthetic efficiencies) thereby making available an additional source of solar energy to the solar thermal plant. In such instances energy influx rates may actually increase at each subsequent iteration so that in some operational region the positive feedback mechanism may re-enforce itself.

The present application outlines an example in which the solar thermal plant is supported by irrigation allowing it to operate day and night throughout the year. This is achieved assuming only 60% of irrigation comes from rain/groundwater sources; thus almost twice as much water is input to the soil than is taken from the ground, potentially recharging this dwindling resource.

Power from solar energy has clear benefits to the environment and manifests itself here on several levels: it is common practice in China, India and other agricultural regions of the world to burn crop residue, releasing large amounts of $CO_2$ into the atmosphere. In contrast biofuel combustion is the only source of $CO_2$ in the configuration of the present invention, should some or all biofuel be generated via digestion/fermentation then a significant proportion of residue carbon will be retained within the fermentation 'by-product'—which makes quality compost.

Composting increases soil nutrient levels and humic content thereby sequestering carbon and improving the soil's resistance to waterlogging and drought. An abundant availability of nutrient rich compost and irrigation water having low contaminant levels may actively regenerate impoverished soils in semi-arid regions and could bring low-grade disused land into production.

Land regeneration, groundwater recharge, food, drinking water and power production—in the present invention these benefits are all procured using renewable sources, without recourse to extraneous (fossil-fuel or otherwise) input and the associated supply and price risk therein. The efficiencies achieved are a consequence of positive feedback mechanisms between the components, each component itself being established in its own right therefore posing limited technological and operational risks.

Figure 3:
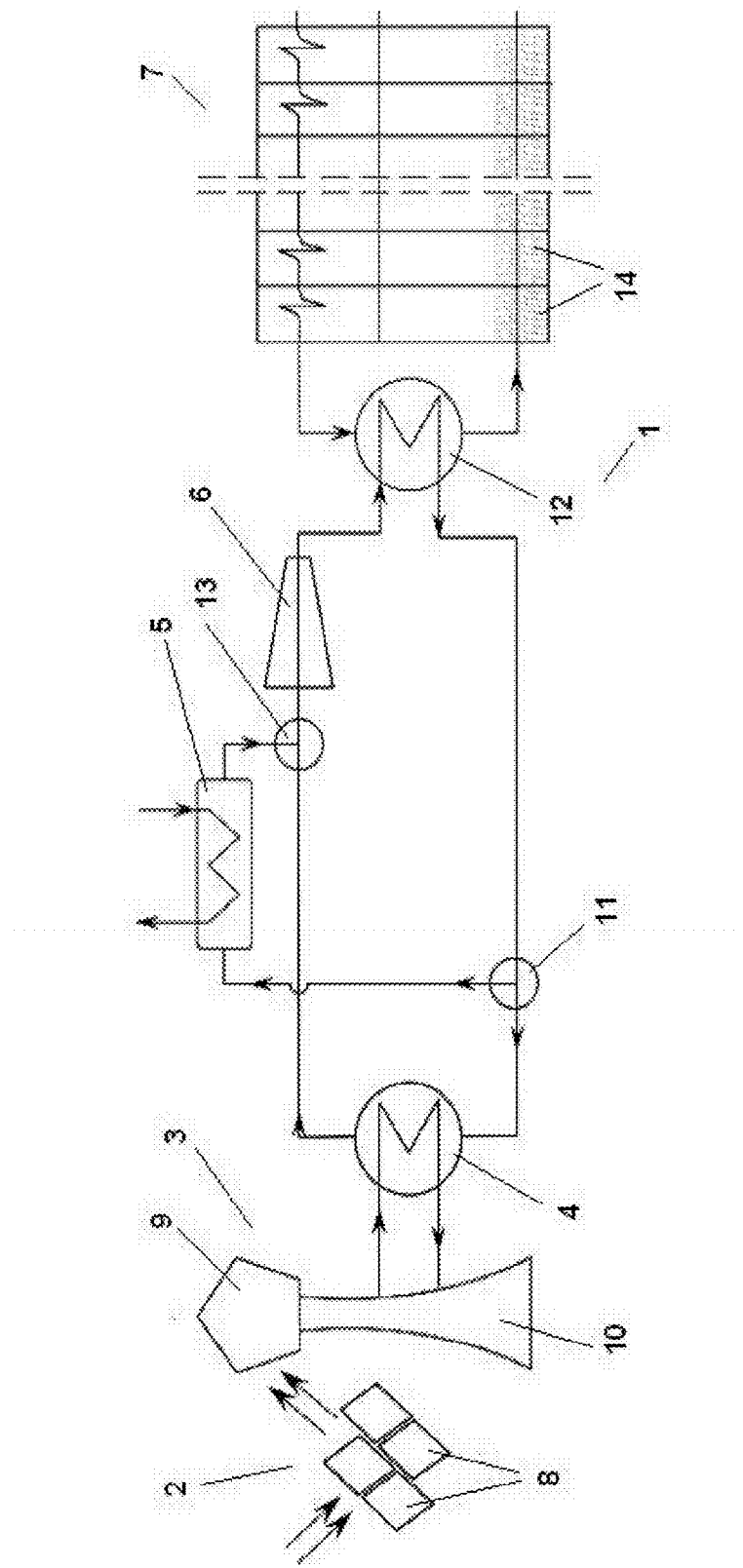
FIG. 3 shows an example apparatus made in accordance with the present invention comprising a heliostat array and solar tower collection system, an unfired boiler, a secondary gas boiler, a steam turbine and a multi-stage flash (MSF) desalination plant.

As is demonstrated herein there are features unique to the set-up of the present invention that do not exist when considered in isolation. These are:

1. Closed autonomous production—outputs of one subsystem are inputs to another, no extraneous fossil energy input required.
2. Positive feedback—by completing a closed-loop "energy circuit" we markedly increase overall system efficiency thereby increasing output.
3. A natural hedge against insolence variation—insolence levels negatively correlate with precipitation. Otherwise reduced solar production and desalination rates are supported by increased crop yields and hence increased biofuel availability resulting from increased precipitation levels. The converse also holds in that elevated insolence is associated with locally increased atmospheric temperatures, raised crop evapotranspiration (water requirement) and reduced precipitation levels: water stress and hence yield reduction associated with reduced natural water availability and concomitant increase of crop water requirements at times of high solar insolence is mitigated by enhanced irrigation via increased solar production/desalination. M FIG. 3 shows a representation of a self-contained electricity and desalinated water co-generation apparatus 1 for use in accordance with the present invention. The system comprises a heliostat array 2 and solar tower 3 collection system, an unfired boiler 4, a secondary gas boiler 5, a steam turbine 6 and a multi-stage flash desalination plant 7 which also serves as a condensing unit for the operation of turbine 6.

Gas boiler 5 is powered from biogas generated via bio-fermentation of residues from wheat crop production supported by irrigation water sourced from the desalination plant. In this set-up the flux of incoming solar energy is reflected by a set of flat-plate mirrors 8 onto a receiver drum 9 situated at the top of a tower 10 around which mirrors 8 are distributed.

Drum 9 contains within it a heat transfer fluid, which is heated by the light incident upon the drum. This fluid is pumped to a heat exchanger in the unfired boiler 4. A secondary feed-flow fluid that supplies the turbine is passed through the boiler and heat is transferred from the heat transfer fluid to the feed-flow. If sufficient energy is available the feed-flow is vaporized and the resulting steam is used to power the turbine 6.

Unlike fossil fuel power plants, the primary energy source for solar varies diurnally and seasonally which translates to a variable steam feed-flow rate to the turbine. As is common in energy plant design a secondary gas boiler 5 is included, which in the present invention is used to support the feed-flow from the unfired boiler 4 to ensure the feed-flow input to turbine 6 is above some minimum.

Splitter 11 ensures that the correct flow from condenser 12 feeds the unfired boiler with the remaining sent to the secondary boiler 5. The output flows from unfired boiler 4 and fired boiler 5 and combines in mixer 13, which feeds turbine 6.

The output flow from turbine 6 is typically wet steam at a reduced temperature and pressure. Before the output flow can be reheated by boilers 4, 5 it must first be condensed and recirculated by a pump. Condenser 12 forms part of multi-stage flash desalination plant 7 so that it serves to condense and cool the feed-flow as required, as well as provide a heat source for desalination which would be otherwise unused in traditional power plant applications.

The application of co-generation for the purpose of desalination provides a good fit as regions most suitable for solar thermal power generation tend also to suffer from water scarcity. The energy obtained from the heat of vaporization and any additional cooling of the feed-flow is transferred via a heat exchanger to the multi-stage flash input brine flow which is then passed to flashing chambers 14. The pressure in each chamber successively reduces so as to ensure the temperature of the heated brine entering the chamber is above its boiling point, thereby causing the brine to 'flash' (vaporize).

As the brine flashes it loses energy, necessitating a pressure-drop in the next stage for the flashing process to continue. The steam produced is condensed on a tube bundle situated at the top of each chamber through which cold brine flows, thus pre-heating it so that energy used to vaporize the brine is reclaimed. Reclaiming the latent heat of the flashing brine leads to much reduced energy requirements, and higher production rates, than simply boiling the brine.

EXAMPLE

Extensive mathematical modelling has been performed to demonstrate the efficacy of the present invention.

In a modelled example for solar irradiance annual direct beam dual-tracking insolence values at a site in Ahmedabad, Gujarat (latitude 23.07, longitude 72.63 and altitude 55 m) as given in Table 1 of Purohit (2010) were used.

To generate irradiance levels for a given time of day and year the annual insolence was scaled to take into account atmospheric attenuation and climatic seasonality.

The modelling undertaken is too extensive to discuss in detail in the present application. However, the results of the modelling are shown in FIGS. 4 to 6 and in Table 1.

Figure 4:
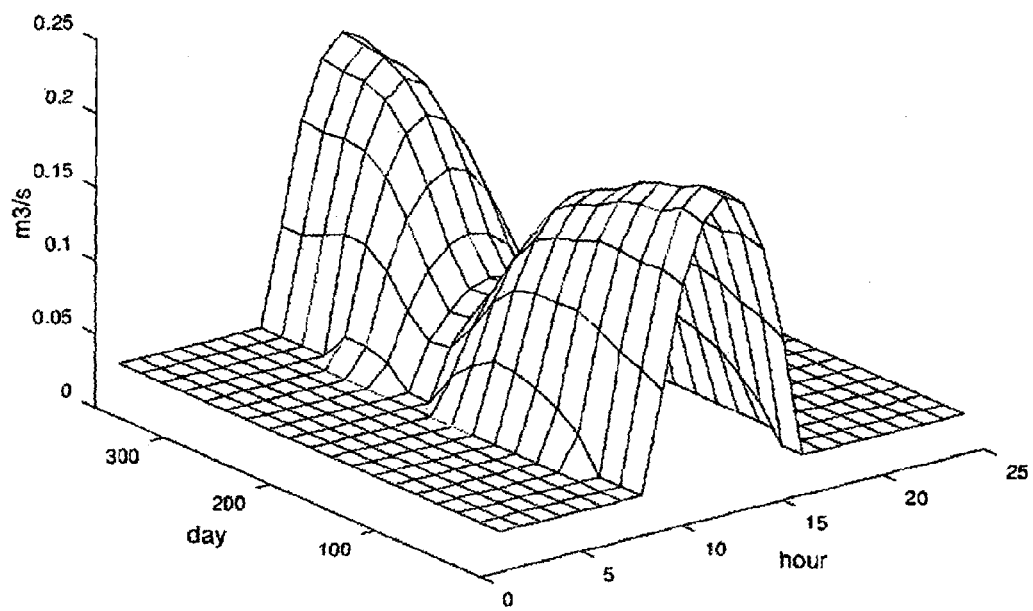
FIG. 4 shows an example desalination rate as a function of time of day and year.

FIG. 4 shows desalination rate as a function of time of day and year.

Figure 5:
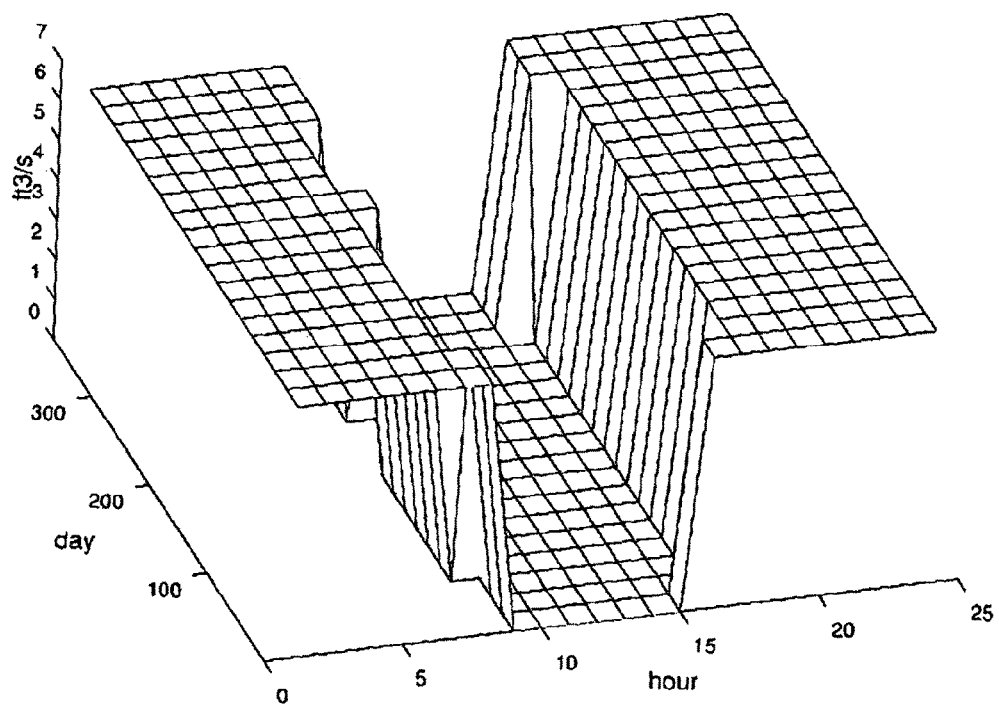
FIG. 5 shows an example biofuel (biogas) consumption rate as a function of time of day and year.

FIG. 5 shows gas consumption rate as a function of time of day and year.

Figure 6:
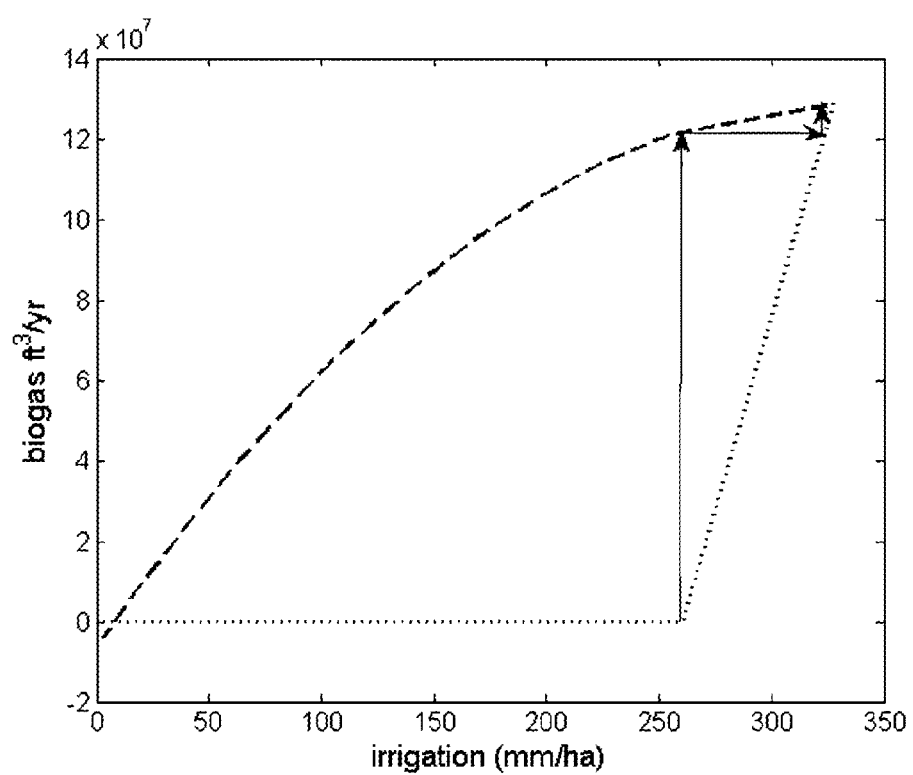
FIG. 6 shows an example annual biofuel (biogas) consumption (dotted line) and production (dashed line) vs. irrigation (mm/ha) given total area of 1239 ha. 90% desalinated water used for irrigation. 60% total irrigation water comes from ground-water sources.

FIG. 6 shows annual gas consumption (dotted line) and production (dashed line) vs. irrigation (mm/ha) given a total area of 1239 ha. 90% desalinated water used for irrigation. 60% total irrigation water comes from ground-water sources.

Table 1 outlines example system outputs without biofuel support in the first year and the progression of the outputs as the system reaches equilibrium. The total desalination output here is about 1.8 million cubic meters of water of which we assume 90% is used for irrigation, comprising 40% of the total.

What is not apparent from these values is that desalinated water is used in the first year and so the yield we see in year one is the enhanced yield. If this water had not been available our irrigation level would be 156 mm/ha giving a grain and compost production of $5.1382 \times 10^6$ kg and $6.2891 \times 10^6$ kg respectively.

Used as a baseline we therefore see an increase of 40.1% in grain and biogas production due to additional irrigation in the first year alone.

In year two, the use of the gas produced in year one gives rise to a 25.9% increase in water production with the plant in operation 98% of the year.

Since the irrigated area is undersized with respect to water production the response to this additional water is muted with a 5.6% increase.

Gas production also increases by the same amount and so after year two the system is virtually at equilibrium with the plant in operation throughout the year.

In conjunction with the gains from the feed-back loop a system in accordance with the present invention is able to attain high desalination rates and irrigation levels over a very large area of land.

TABLE 1

| | Year 1 | Year 2 | Equilibrium |
|---|---|---|---|
| I mm/ha | 260 | 324 | 327 |
| GP $10^8$ ft$^3$ | 1.2180 | 1.2824 | 1.2861 |
| GC $10^8$ ft$^3$ | 0 | 1.2180 | 1.2824 |
| DW $10^5$ m$^3$ | 1.4325 | 1.7836 | 1.8034 |
| G $10^6$ kg | 6.8188 | 7.1795 | 7.1999 |
| C $10^6$ kg | 8.3462 | 8.7878 | 8.8127 |
| e $10^6$ kWh | 3.1213 | 3.5278 | 3.5508 |
| $T_{op}$ % yr | 35 | 98 | 100 |

Gas Consumption (GC), Gas Production (GP), Irrigation (I), Drinking Water (DW), Grain (G), Compost (C), Electricity (e), % operation Top.

It should be noted that where this application discusses biofuel this term is meant to encompass any organic matter derived from a crop that may be used as a fuel, either untreated biomass or specific biofuels, such as ethanol or methane derived from such biomass.

It should also be noted that where the application discusses a means for treating water this will most commonly be a means for purifying water. Purification in the context of this application may be taken to mean at least the act of making useful a source of water for the purpose of the means for irrigating and growing crops. Preferably purification may be taken to mean the act of making a source of water suitable for human consumption, i.e. drinking water. The means for purifying water may specifically be a means for desalinating water.

Many variations are possible without departing from the scope of the present invention as set out in the appended claims.

The invention claimed is:

1. A system for producing electricity and treated water comprising:
   I) equipment for solar generation of electricity;
   ii) equipment for generation of electricity from biofuel;
   iii) equipment for treating water;
   iv) equipment for irrigating and growing crops;
   v) equipment for generating biofuel;
   wherein at least one output from the equipment for generation of electricity may be used to power the means for treating water;
   the equipment for irrigating and growing crops uses purified water generated by the equipment for treating water which is communicated to the equipment for irrigating and growing crops;
   the equipment for generating biofuel uses at least some of the crops grown using purified water from the equipment for irrigating and growing crops and/or their residues;
   biofuel made available by the equipment for generating biofuel is used as a source of fuel in the equipment for generating electricity from biofuel.

2. The system of claim 1 wherein one output from the equipment for generation of electricity used to power the equipment for treating water is a source of thermal energy.

3. The system of claim 2 wherein the source of thermal energy is steam.

4. The system of claim 1 wherein one output from the equipment for generation of electricity used to power the equipment for treating water is electricity.

5. The system of claim 1 wherein the equipment for generating electricity from biofuel comprises a fired boiler and a turbine.

6. The system of claim 1 wherein the equipment for generating electricity from biofuel comprises a fuel-cell.

7. The system of claim 1 wherein the equipment for treating water comprises a multi-stage flash desalination plant.

8. The system of claim 1 wherein the equipment for treating water comprises a thermophillic sewage treatment system.

9. The system of claim 1 wherein the equipment for treating water includes a reverse osmosis plant powered at least in part from electricity output by the equipment for generating electricity.

10. The system of claim 1 wherein the equipment for treating water comprises a heat exchanger serving as conduit of energy from the equipment for generating electricity to the equipment for treating water.

11. The system of claim 10 wherein the heat exchanger serves as a condensing unit for the output of a turbine.

12. The system of claim 11 wherein the output flow from the condensing unit may be selectively fed to either or both an unfired and fired boiler.

13. The system of claim 1 wherein the equipment for generation of solar electricity comprises a solar thermal collection system and an unfired boiler.

14. The system of claim 13 wherein the solar thermal collection system comprises a heliostat array and a solar tower system.

15. The system of claim 1 wherein the equipment for generation of solar electricity comprises a photo-voltaic system.

16. The system of claim 1 further comprising equipment for the storage of biofuel.

17. A method for producing electricity and treated water comprising the steps of:
   i) providing the system according to claim 1;
   ii) generating electricity and treated water.

18. Electricity produced by the system of claim 1.

19. Treated water produced by the system of claim 1.

20. Biofuel produced by the system of claim 1.

21. Crops produced by the system of claim 1.

* * * * *